US006978620B2

(12) United States Patent
Cooper et al.

(10) Patent No.: US 6,978,620 B2
(45) Date of Patent: Dec. 27, 2005

(54) START-UP METHOD FOR POWER PLANT (75) Inventors: Gregory E. Cooper, Ballston Spa, NY (US); James H. Moore, Schenectady, NY (US); Jatila Ranasinghe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 10/774,552

(22) Filed: Feb. 9, 2004

(65) Prior Publication Data

US 2005/0172633 A1    Aug. 11, 2005

(51) Int. Cl.[7] ............................. F02C 6/00; F02C 6/18; F02C 7/26
(52) U.S. Cl. ..................... 60/778; 60/786; 60/39.182
(58) Field of Search ................ 60/778, 786, 39.182

(56) References Cited

U.S. PATENT DOCUMENTS 5,647,199 A * 7/1997 Smith ........................... 60/783
5,649,416 A * 7/1997 Moore ....................... 60/39.182
5,737,911 A * 4/1998 Hoizumi et al. ............... 60/783

* cited by examiner

Primary Examiner—Ted Kim
(74) Attorney, Agent, or Firm—Polster, Lieder, Woodruff & Lucchesi, L.C.

(57) ABSTRACT

A variable loading rate method of starting a plurality of gas turbines (GT1, GT2) used in a combined cycle power plant for generating electricity. A first gas turbine is started and allowed to operate at a minimum load condition. The turbine is maintained at this load level while a second gas turbine is started brought up to its minimum load condition. Start-up of a steam turbine (ST) to which the gas turbines are operationally coupled is initiated while both gas turbines are maintained at their minimum load conditions. The load on both gas turbines is then increased to a predetermined level, which is greater than their minimum load levels, once operating temperatures within the steam turbine reach predetermined levels. Subsequently, both gas turbines are loaded as function of the load on the a steam turbine at to which the gas turbines are coupled. This variable loading rate starting sequence lowers the amount of $NO_2$ produced during start-up of the turbines and reduces the occurrence of a visible yellow plume at a power generating plant.

16 Claims, 9 Drawing Sheets

START-UP METHOD FOR POWER PLANT

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to the operation of combined cycle power plants, and more particularly, to an improved method of starting the power plant, using a variable loading rate strategy, to reduce emissions including visible emissions such as "yellow plume".

In many locales, electrical utilities have power plants located close to urban areas. If the utility uses gas turbines for power generation, it is common for visible pollutants, commonly referred to as "yellow plume" to be emitted from exhaust stacks of the plant when the gas turbines are started. Yellow plume occurs when the amount of $NO_2$ produced during start-up exceeds 20 parts per million or ppm. Yellow plume is a visible discharge from the exhaust stacks at the power plant and since the stacks are typically quite tall, the yellow plume is readily visible over a large area. The yellow plume condition is typically temporary only and the plume dissipates as the gas turbines in the plant reach their nominal operating status. However, it is common for the visible plume to last for upwards of an hour or more which can result in complaints from those in the area about the plant.

It has been found that by modifying the plant start-up procedure, the amount of time the $NO_2$ exceeds 20 ppm is substantially reduced. This not only reduces the amount of time a yellow plume may be produced, but lowers the amount of these emissions produced during the start-up cycle.

BRIEF SUMMARY OF THE INVENTION

Briefly stated, the present invention is directed to an improved method for starting up a combined cycle power plant to generate electricity. The starting sequence is for use with two gas turbines which feed a steam turbine, but can be used with one or more gas turbines. In particular, the present invention employs a variable loading rate, rather than a relatively constant loading rate to reduce the amount of $NO_2$ emissions from the power plant.

In accordance with the invention, a first gas turbine is started and is allowed to run up to its spinning reserve or minimum load condition. The first gas turbine is then held at that condition while a second gas turbine is started and allowed to run up to its spinning reserve. The two gas turbines are maintained at this operational level while a steam turbine to which they are operationally coupled is started. Once the steam level is brought on-line, with temperatures within the steam turbine attaining predetermined levels, the loads on both gas turbines are increased from their minimum to a predetermined load level. This is done at a maximum rate of increase. Thereafter, the loads on both gas turbines is determined by the load on the steam turbine. While the total start-up time is comparable to that using current start-up protocols, the amount of $NO_2$ produced is substantially reduced. And, the amount of time during which a visible yellow plume may be produced at the power plant where the turbines are installed is reduced by approximately 90%. Thus, both the amount of emissions and the visible evidence of such emissions are decreased.

The start-up sequence can be used for cold, warm, and hot starts of the turbines with emissions and visible yellow plume being substantially reduced in each situation.

The foregoing and other objects, features, and advantages of the invention will be in part apparent and in part pointed out hereinafter.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Referring to the drawings, the present invention is directed to a method of starting-up a power plant in a manner that gas turbines and the a steam turbine to which they are operationally coupled can be brought on-line in a manner that substantially reduces the amount of $NO_2$ produced during this period and a "yellow plume" of exhaust which occurs when a certain levels of the emissions occurs. Neither the construction of the gas or steam turbines, how they are coupled together, or their operation after the start-up sequence is complete form a part of this invention.

Figure 2:
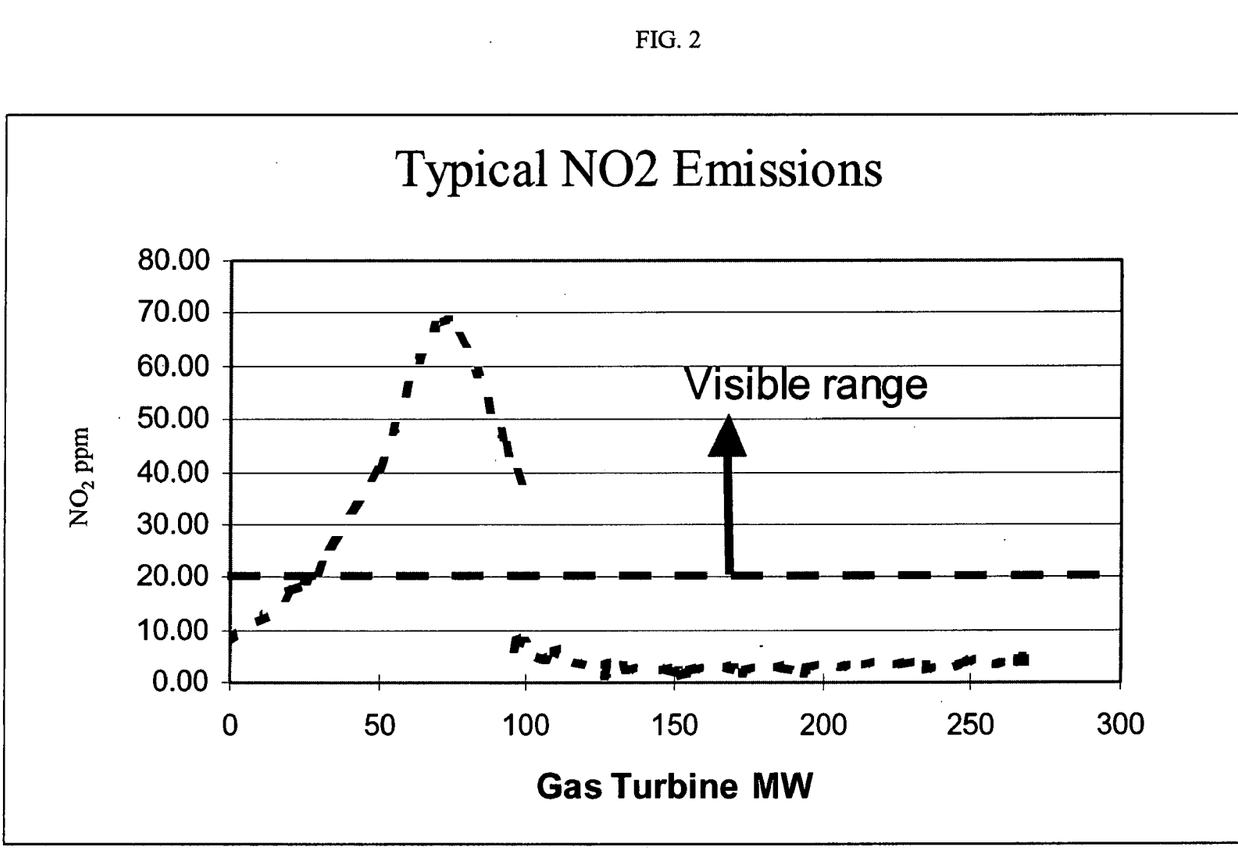
FIG. 2 is a graph illustrating NO2 emissions for a gas turbine.

In FIG. 2, a representative graph is presented which plots $NO_2$ in ppm against the power output (in megawatts) of a gas turbine. As shown therein, "yellow plume" occurs when $NO_2 > 20$ ppm. The operating range of the gas turbine over which this occurs is shown in FIG. 2 to be between ≈20 MW and 100 MW. This, for example, represents between 10–50% of the gas turbine's rated load capability.

For a power generating configuration comprising two gas turbines GT1 and GT2 operationally coupled with a steam turbine ST, the conventional start sequence has been to first start gas turbine GT1. Once started, the steam temperature has risen to a first level which is, for example 700° F. (371° C.). Once the steam temperature reaches this initial level, the temperature is then ramped up to 850° F. (454° C.). When this second temperature level is attained, gas turbine GT1 starts to be loaded. The load level is a function of the operating conditions of steam turbine ST, and the load on gas turbine GT1 is increased at a rate of ≈1% of its rated load per minute until a base load level is reached.

As gas turbine GT1 is being loaded, gas turbine GT2 is now started-up. This second gas turbine is now loaded, simultaneously with gas turbine GT1, at the same rate of ≈1%/min. This loading continues until both gas turbines GT1 and GT2, and steam turbine ST reach their base loads.

Figure 3:
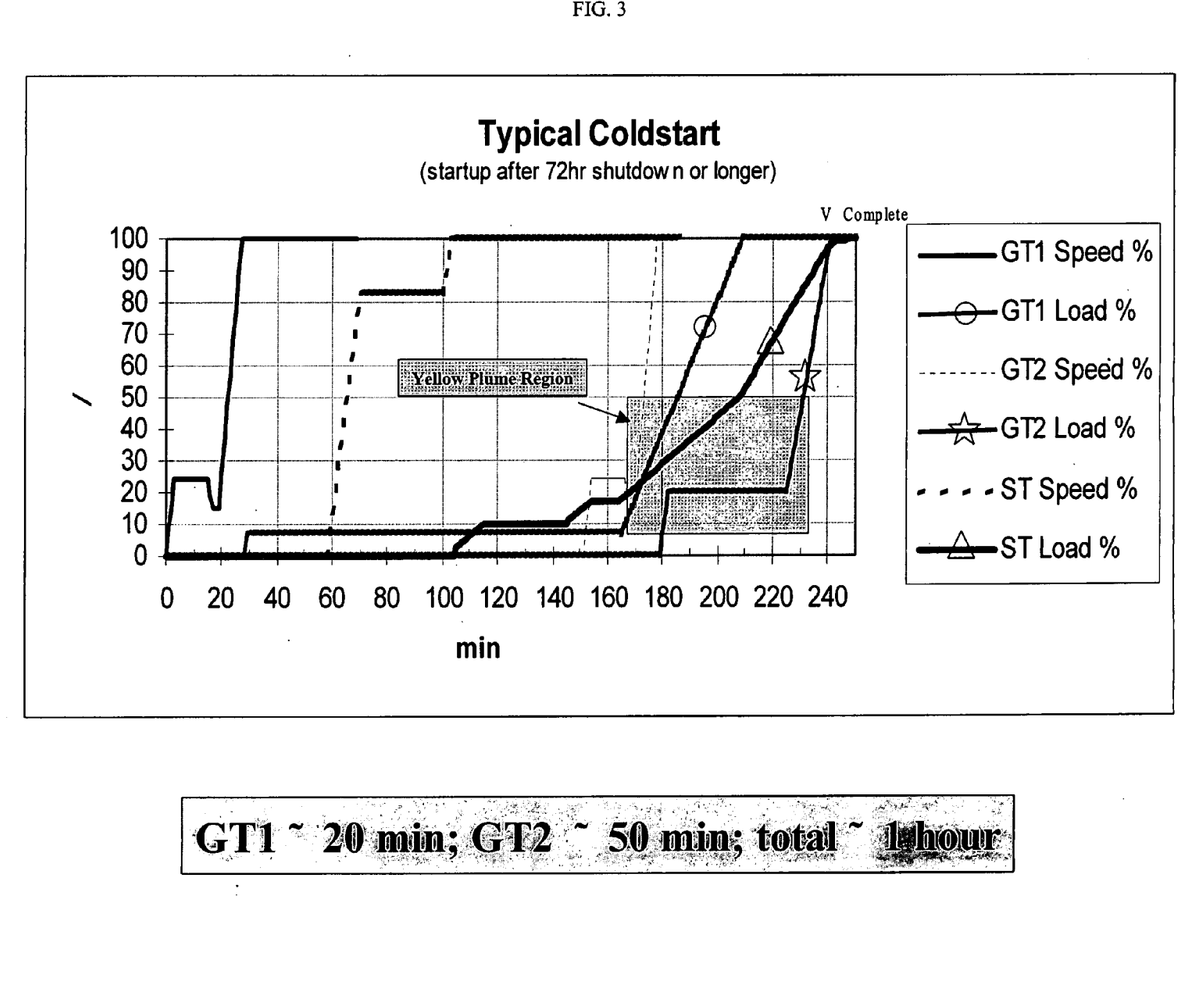
FIGS. 3–5 are graphs representing "yellow plume" conditions for cold start, warm start, and hot start of gas turbines using PRIOR ART techniques; and, FIGS. 6–8 are similar graphs representing the improved "yellow plume" conditions for cold start, warm start, and hot start of the gas turbines using the method of the present invention.
Figure 4:
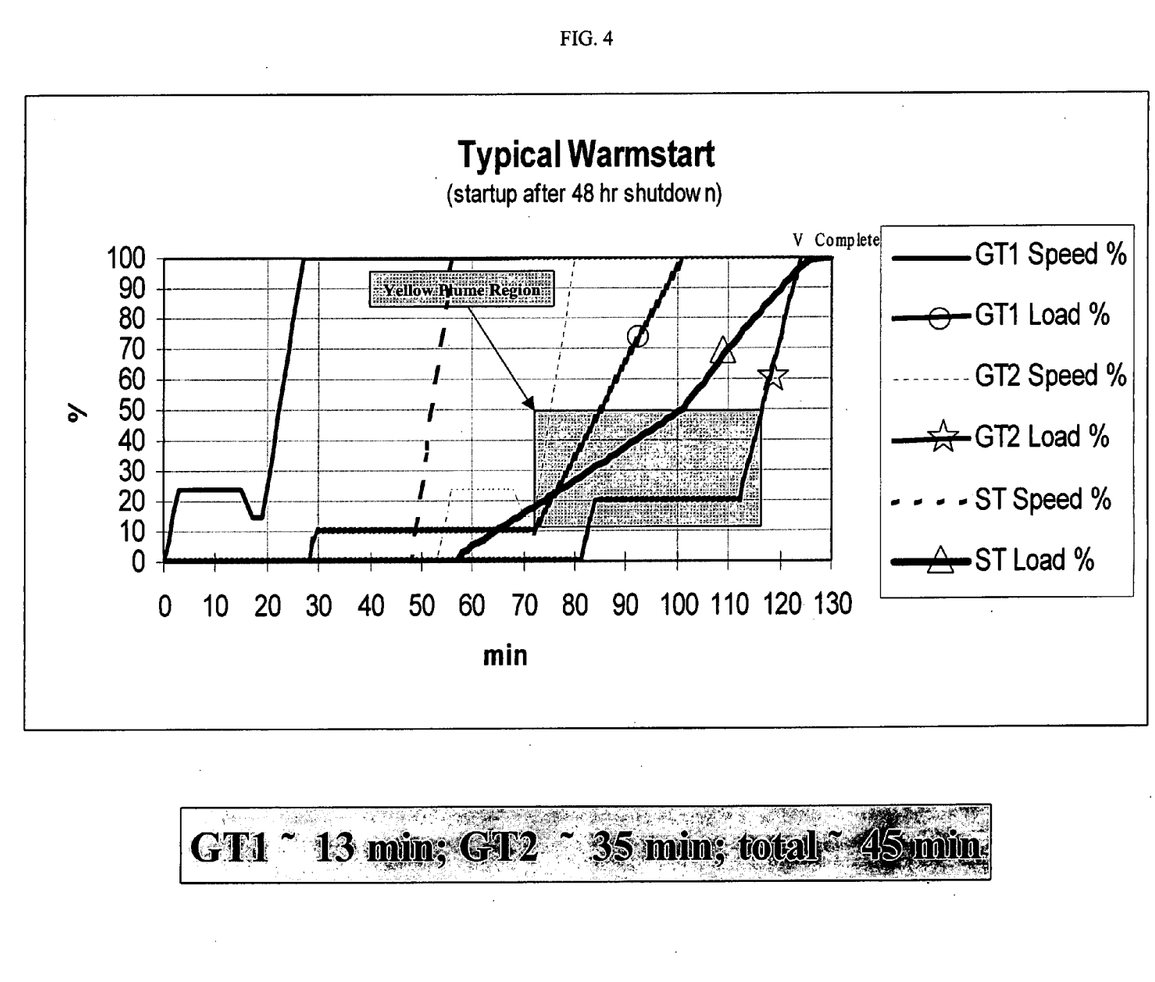
Figure 5:
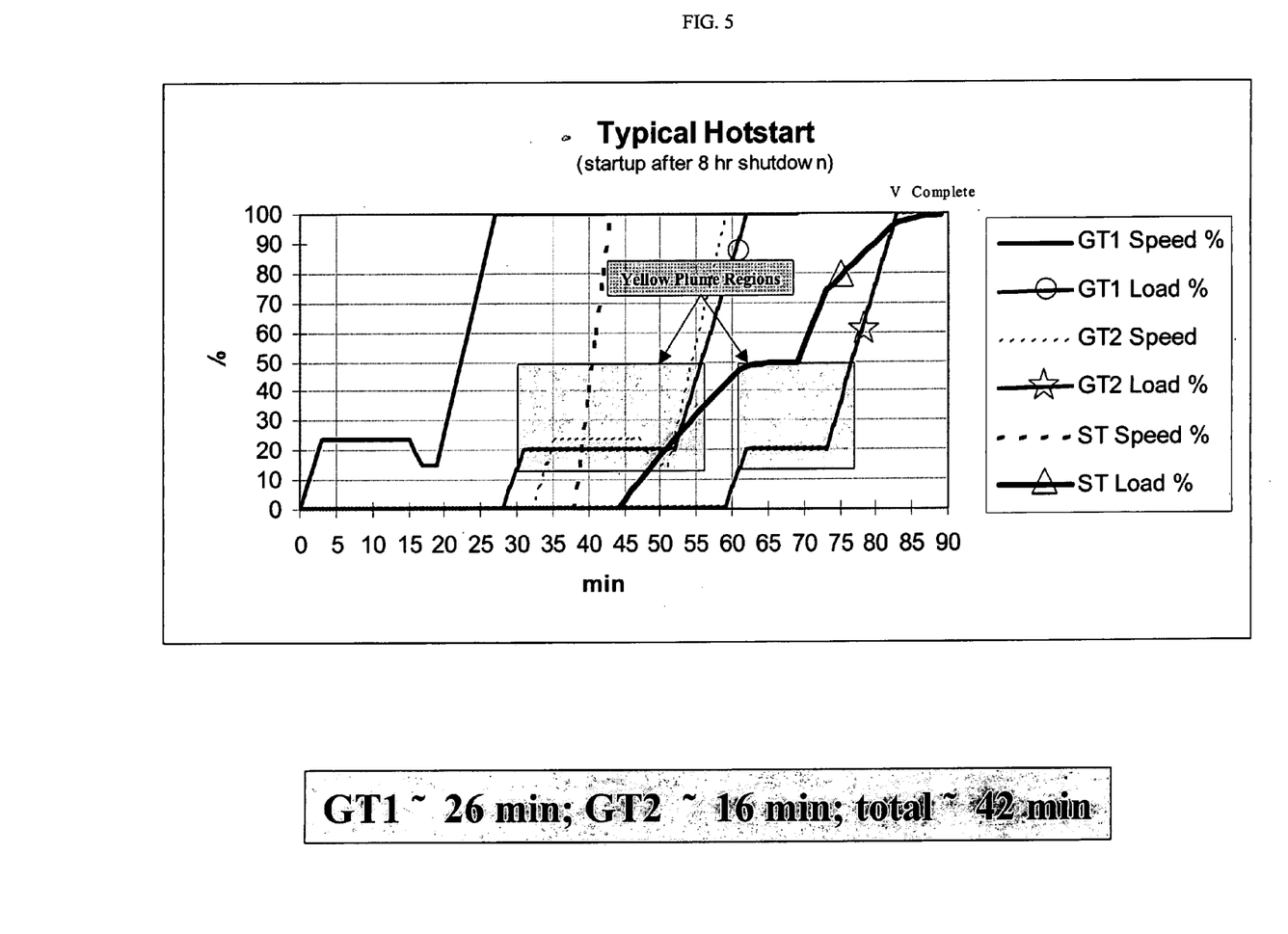

Referring to FIGS. 3–5, the results of this start-up sequence are shown for three power plant conditions; cold start, warm start, and hot start. Those skilled in the art will understand that the graphs shown in FIGS. 3–5 are for one plant only and that the time line (including yellow plume) conditions may be different for other power plants.

FIG. 3 illustrates a cold start start-up in which the turbines have shutdown for a period, for example, of 72 hours or longer. As shown in FIG. 3, gas turbine GT1 reaches 100% of its rated speed after approximately 30 minutes. At that time, the turbine begins to be loaded. Approximately 1 hour after start-up of gas turbine GT1, steam turbine ST starts-up. The time for the steam turbine to attain its full operating speed is approximately 45 minutes. At this time, the steam turbine begins being loaded. Second gas turbine GT2 is started at about 2½ hours into the start-up sequence, at about the 3 hour mark, the load on this second gas turbine starts to increase. The start-up sequence is complete, with steam turbine ST operating at 100% of its rated load, approximately 4 hours after the process begins.

In FIG. 3, the yellow plume region is shown to be caused by emissions from both gas turbines. A yellow plume condition caused by gas turbine GT1 lasts for approximately 20 min., while that caused by gas turbine GT2 lasts for approximately 50 min. However, because there is an overlap in yellow plume conditions, the overall yellow plume period lasts for one hour.

FIG. 4 illustrates a warm start start-up in which the turbines have shutdown for a period, for example, of 48 hours. As shown in FIG. 4, gas turbine GT1 now reaches 100% of its rated speed in less than 30 minutes. At that time, the turbine begins to be loaded. Approximately 48 minutes after start-up of gas turbine GT1, steam turbine ST starts-up. The time for the steam turbine to attain its full operating speed is now only 5–10 minutes, at which time the steam turbine begins being loaded. Second gas turbine GT2 is again started at approximately the same time as steam turbine ST. Also again, gas turbine GT2 is maintained at a low level of operation, both speed and load, until steam turbine ST reaches 100% of its rated speed and starts being loaded. Now, the speed of gas turbine GT2 starts increasing at about the 55 minute mark, and the load on this second gas turbine starts to increase at about the 80 minute mark. The start-up sequence is complete, with steam turbine ST operating at 100% of its rated load, slightly over 2 hours after the process begins.

In FIG. 4, the yellow plume region again is the result of emissions from both gas turbines. The condition caused by gas turbine GT1 lasts for approximately 13 min., while that caused by gas turbine GT2 lasts for approximately 35 min. Because of the overlap, the overall yellow plume period lasts for 45 minutes.

FIG. 5 illustrates a hot start start-up in which the turbines have been shutdown for only about 8 hours. In FIG. 5, gas turbine GT1 reaches 100% of its rated speed in less than 30 minutes. At that time, the turbine begins to be loaded. Between 35–40 minutes after start-up of gas turbine GT1, steam turbine ST starts-up. The time for the steam turbine to attain its full operating speed is now only about 5 minutes. At about this 45 minute elapsed time mark, steam turbine ST begins being loaded. Second gas turbine GT2 again started at approximately the same time as steam turbine ST and is its operating speed and load are increased in a manner similarly described with respect to FIGS. 3 and 4. The start-up sequence is complete, with steam turbine ST operating at 100% of its rated load approximately 90 minutes hours after the start-up process begins.

In FIG. 5, there is no overlap of yellow plume conditions. A yellow plume condition for gas turbine GT1 starts at approximately the 30 minute mark and lasts for slightly more than 25 minutes. A yellow plume condition caused by gas turbine GT2 begins some ten minutes later (approximately 1 hour into the sequence), and lasts for a little over 15 minutes. As a result, the total time period in which there is a visible yellow plume is something over 40 minutes, or about one-half the start-up cycle.

Figure 1A:
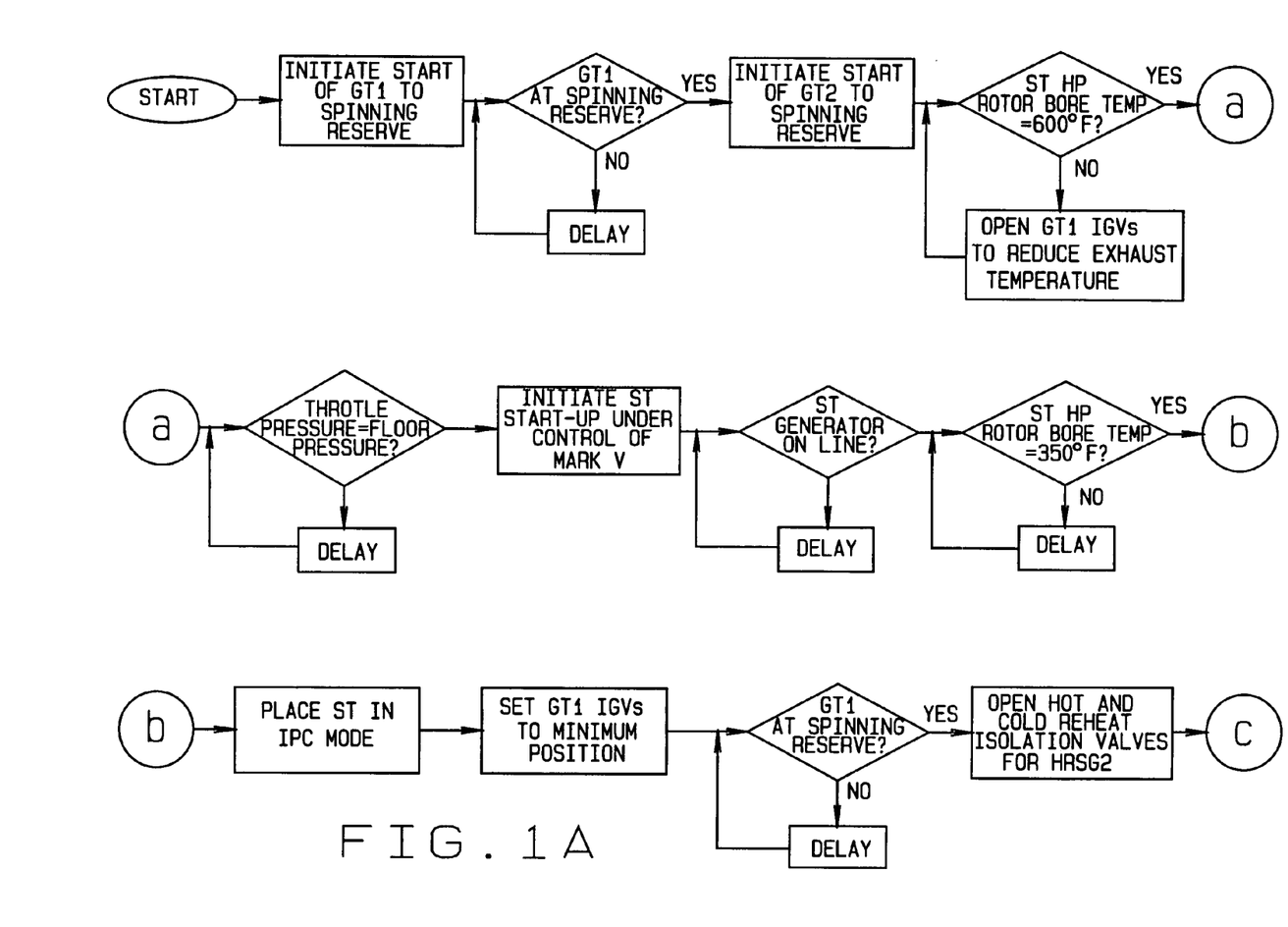
FIGS. 1A and 1B are a flow chart for use of the start-up method of the present invention.
Figure 1B:
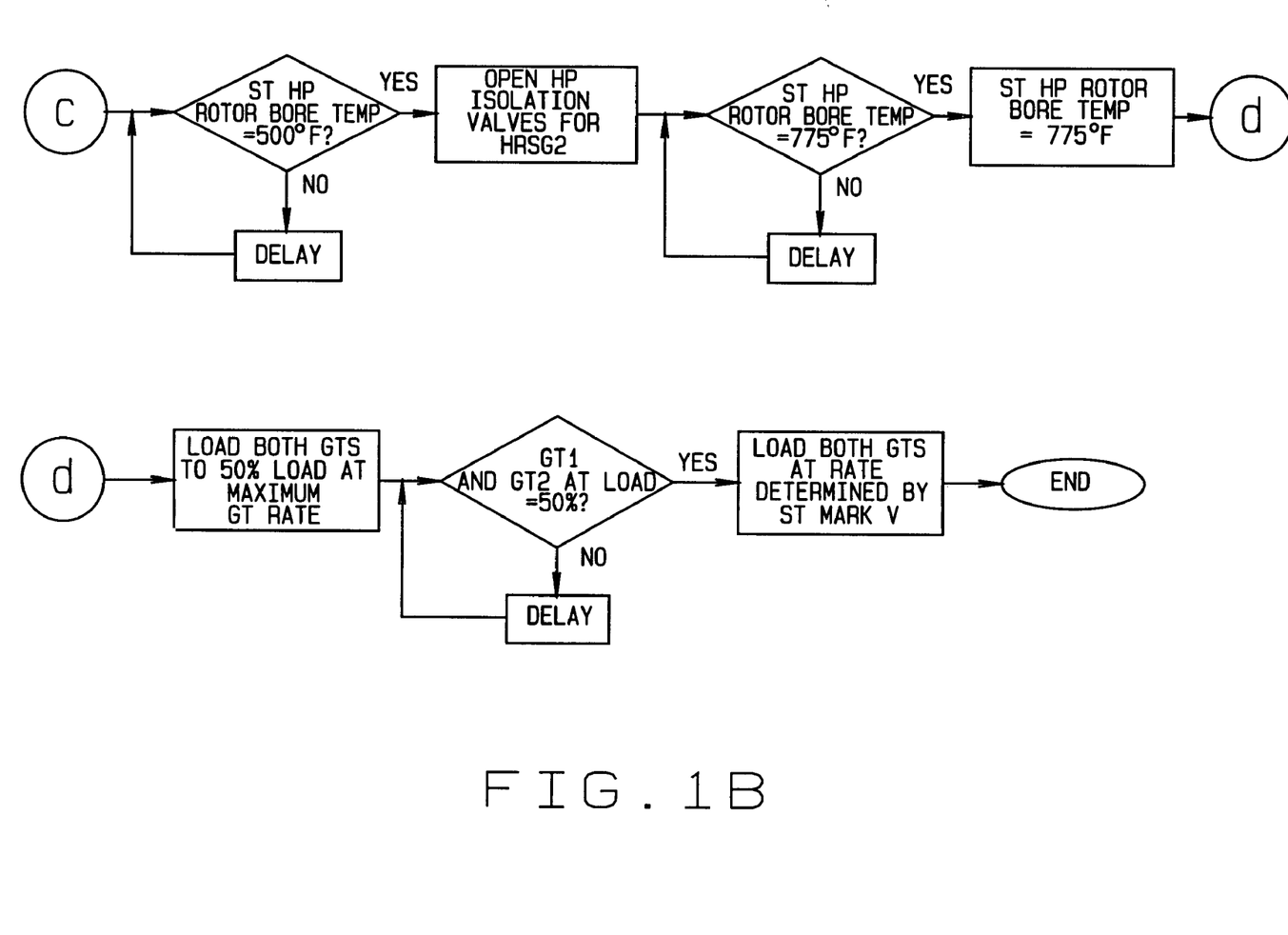

Referring to FIGS. 1A and 1B, and in accordance with the present invention, a new method of start-up is used which substantially reduces emissions and minimizes yellow plume conditions. In accordance with the method of the invention, gas turbine GT1 is first powered up and brought up to its spinning reserve or minimum load condition. Once the gas turbine reaches its spinning reserve, the second gas turbine GT2 is started, and it is also brought up to its spinning reserve condition.

Once both gas turbines GT1 and GT2 are at their spinning reserve, the rotor bore temperature in the high pressure (HP) section of the steam turbine ST is calculated. If the temperature is less than 600° F. (315° C.) then the inlet guide vanes (IGVs) of gas turbine GT1 are opened to adjust air flow and reduce the exhaust temperature. In addition to calculating the rotor bore temperature in the HP stage section of steam turbine ST, the throttle pressure is checked to determine if the heat recovery steam generator (HRSG) is above the floor pressure. Those skilled in the art will appreciate that the throttle pressure level will vary depending upon whether the start-up is a cold start, warm start, or hot start.

Once the HP section rotor bore temperature equals or exceeds 600° F. (315° C.), and the throttle pressure equals or exceeds the floor pressure, start-up of the steam turbine is initiated under control of a control system such as the Mark V system whose design and operation is known in the art.

Once steam turbine ST is on line, the rotor bore temperature of the HP section of the turbine is again checked to see if it now equals or exceeds 350° F. (177° C.). If it does, then the steam turbine is placed in an inlet pressure control (IPC) mode of operation. In this operational mode, the quantity of steam supplied from gas turbines GT1 and GT2 to the steam turbine is a function of the gas turbine load.

At this time, the steam turbine ST is on line, the inlet guide vanes of gas turbine GT1 are set to their minimum position and gas turbine GT2 is monitored to see if it is operating at its spinning reserve. If it is, hot and cold reheat isolation valves for the heat recovery steam generator of gas turbine GT2 are opened. This serves to combine the steam from GT2 with GT1 to be admitted to the steam turbine ST.

Next, the rotor bore temperature of the high pressure stage of the steam turbine is checked to see if it equals or exceeds 500° F. (260° C.). When it does, the high pressure stage isolation valves for the heat recovery steam generator for gas turbine GT2 are opened. After this is done, the rotor bore temperature for both the high pressure and intermediate pressure (IP) stages of the steam turbine are monitored until both equal or exceed 775° F. (413° C.). When these temperature levels in these stages are reached, the loading on both gas turbines GT1 and GT2 are increased from their minimum loads (spinning reserves) to 50% of their rated loads. This is done at the maximum loading rate for each gas turbine. When their loads both equal 50% of their rated loads, control of their loads is turned over to, and subsequently controlled by the controller of the steam turbine.

Figure 6:
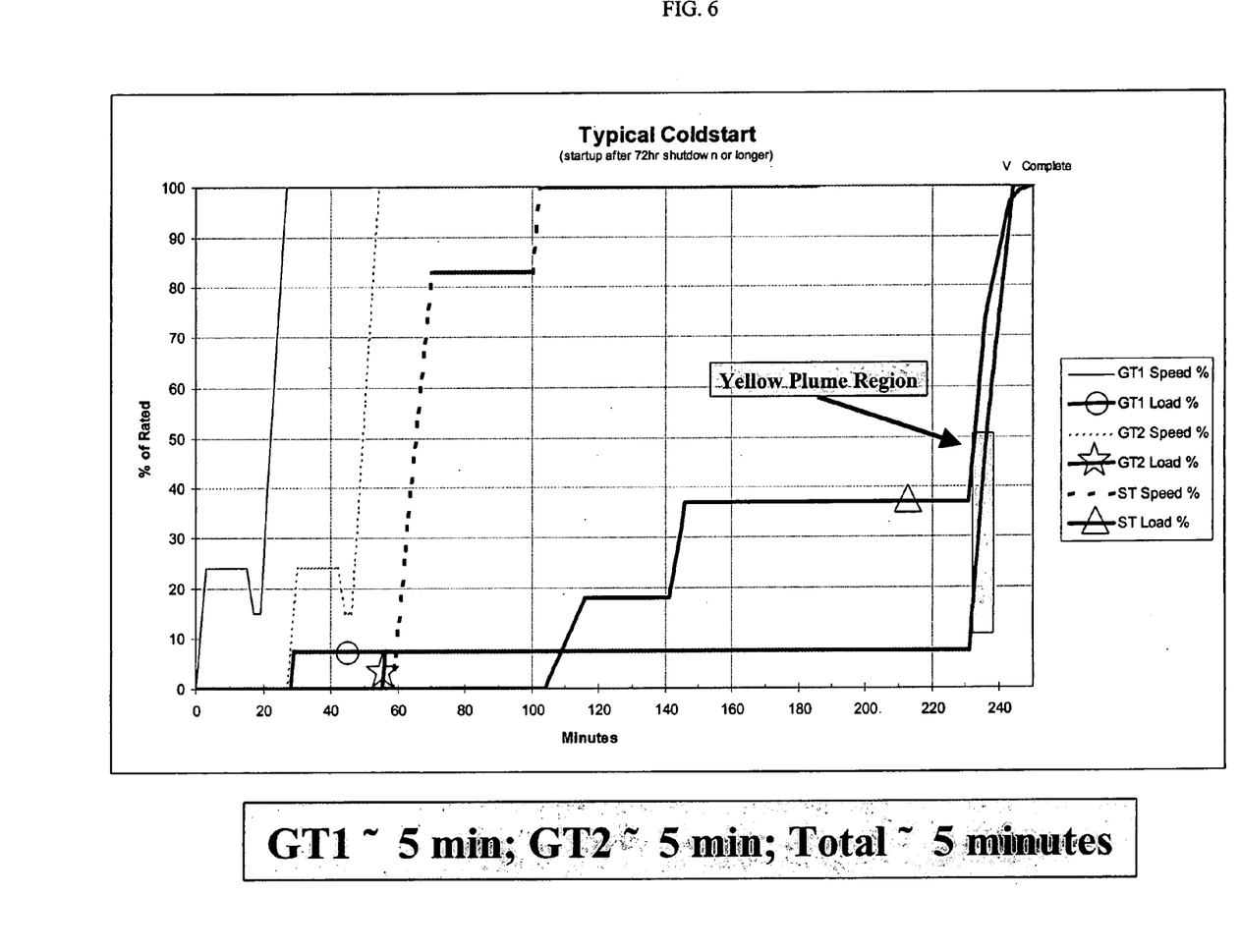
Figure 7:
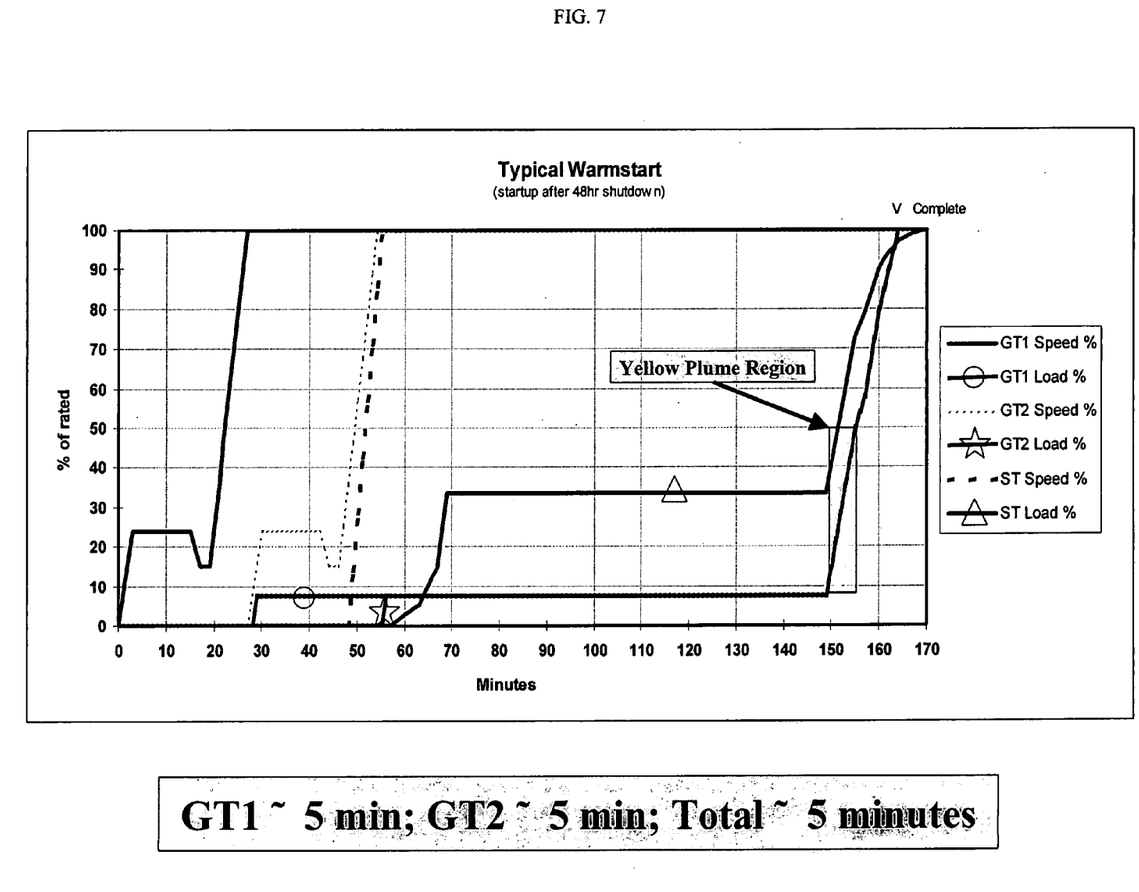
Figure 8:
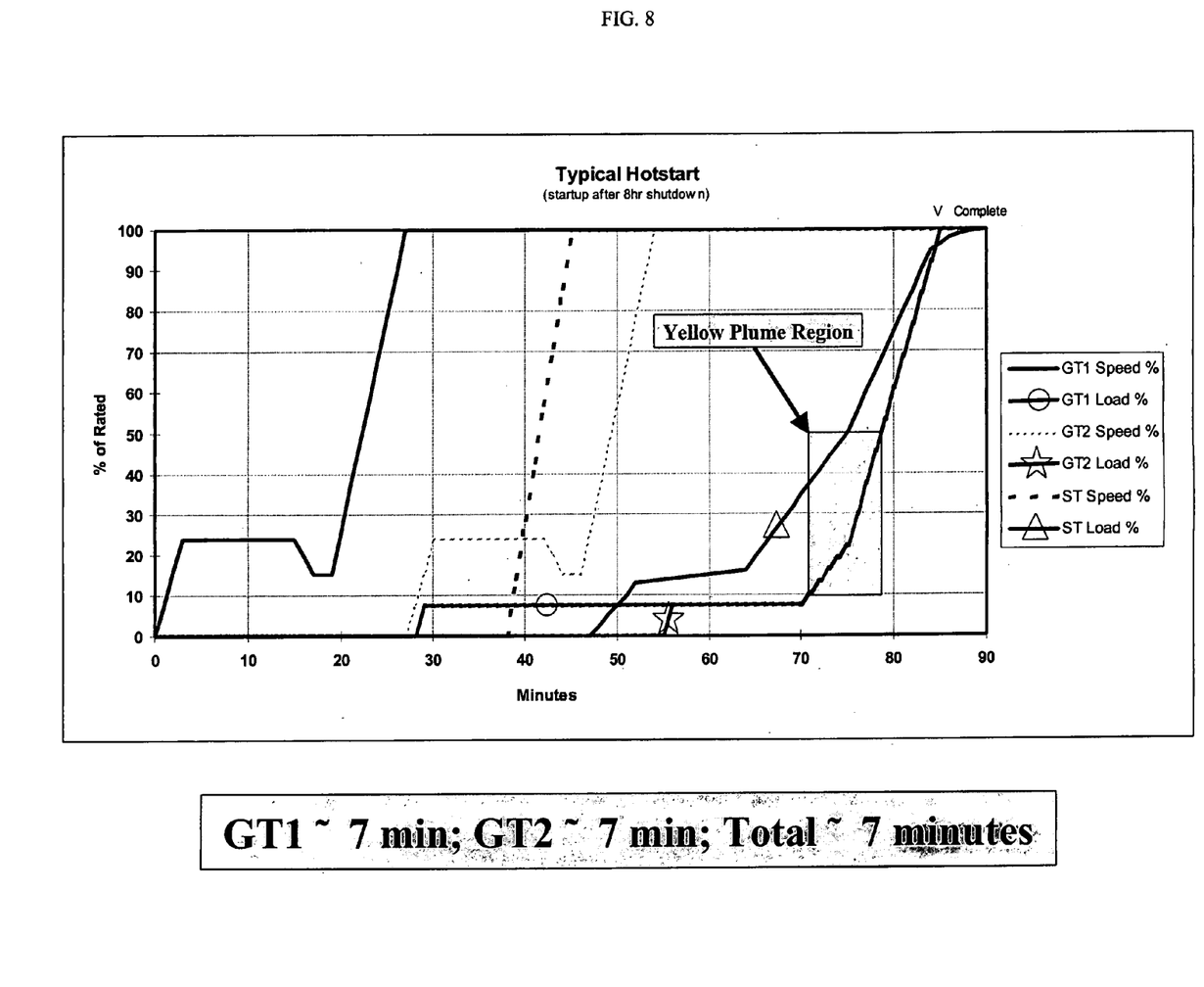

Referring to FIGS. 6–8, the effect of this variable loading rate start-up procedure on yellow plume conditions is readily seen for cold start, warm start, and hot start conditions of the turbines.

In FIG. 6, the reduction in $NO_2$ produced during a cold start-up using the above described method of the invention reduces the period when a visible yellow plume may occur from approximately one-hour, as shown in FIG. 3, to approximately 5 minutes. A yellow plume condition lasting 5 minutes may appear for both gas turbines, but the times when these occur essentially overlap, as indicated in FIG. 6. Accordingly, there is a reduction in yellow plume of about 90%.

In FIG. 7, the reduction in $NO_2$ produced during a warm start-up using the above described method again reduces the period when a visible yellow plume may occur from approximately the 45 minute period shown in FIG. 4, to again approximately 5 minutes. A yellow plume condition lasting 5 minutes may again appear for both gas turbines; but, again, the times when these occur overlap, as indicated in FIG. 7. Accordingly, there is a reduction in yellow plume of about 88%.

Finally, in FIG. 8, the reduction in $NO_2$ produced during a hot start-up using the method of the invention reduces the period when a visible yellow plume may occur from approximately 42 minutes, as shown in FIG. 5, to approximately 7 minutes. As with both the cold and warm start-up situations, a yellow plume condition lasting 7 minutes may appear for both gas turbines, but the times when these occur still essentially overlap, as indicated in FIG. 8. Accordingly, there is a reduction in yellow plume of about 80%.

Use of the start-up method of the invention does not appreciably affect the time interval from initial start-up through completion of the start-up cycle. Thus, in bringing gas turbines GT1 and GT2 and steam turbine ST into their operational modes, substantial reductions in $NO_2$ are achieved and the amount of time a visible yellow plume is created is significantly reduced, all without impacting the amount of time required for start-up.

In view of the foregoing, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A variable loading rate method of starting a plurality of gas turbines used in a power plant for generating electricity comprising:

starting a first gas turbine and bringing it up to operate at a minimum load condition;

maintaining the first gas turbine at its minimum load condition while starting a second gas turbine and bringing it up to operate at its minimum load condition;

initiating start-up of a steam turbine to which the gas turbines are operationally coupled while maintaining both gas turbines at their minimum load conditions;

increasing the load on both gas turbines to a predetermined level greater than their minimum load levels once operating temperatures within the steam turbine reach predetermined levels; and, subsequently loading both gas turbines as function of the load on the steam turbine to which the gas turbines are coupled, the starting sequence lowering the amount of $NO_2$ produced during start-up of the turbines and the occurrence of a visible yellow plume at the power plant.

2. The method of claim 1 in which the gas turbines are initially in a cold start condition.

3. The method of claim 1 in which the gas turbines are initially in a warm start condition.

4. The method of claim 1 in which the gas turbines are initially in a hot start condition.

5. The method of claim 1 in which starting the first gas turbine includes bringing it to a spinning reserve operating condition.

6. The method of claim 5 in which the second gas turbine is not started until the first gas turbine is at its spinning reserve condition.

7. The method of claim 6 further including start-up of the steam turbine when a rotor bore temperature of the steam turbine is at a first predetermined temperature.

8. The method of claim 7 in which the start-up of the steam turbine further requires a throttle pressure of the steam turbine to be at a minimum floor pressure level which varies depending upon whether the turbines are undergoing a cold start, warm start, or hot start.

9. The method of claim 8 further including bringing the steam turbine on-line and placing it in an inlet pressure control mode of operation.

10. The method of claim 9 further including placing inlet guide vanes of the first gas turbine to a minimum setting.

11. The method of claim 10 further including opening hot and cold reheat isolation valves for a heat recovery steam generator of the second gas turbine when the second gas turbine reaches its spinning reserve thereby to isolate the second gas turbine from the first gas turbine.

12. The method of claim 11 further including increasing the rotor bore temperature of the steam turbine to a second predetermined temperature.

13. The method of claim 12 further including opening high pressure isolation valves in the heat recovery steam generator of the second gas turbine when the rotor bore temperature in the second gas turbine reaches or exceeds its second predetermined temperature.

14. The method of claim 13 further including increasing both a high pressure rotor bore temperature and intermediate pressure rotor bore temperature of the steam turbine to a predetermined temperature and loading both the first and second gas turbines to a predetermined load level at a predetermined loading rate.

15. The method of claim 14 in which the loading rate is a maximum loading rate for the gas turbines.

16. The method of claim 14 in which the loading on the first and second gas turbines is subsequently controlled at a rate determined by the load of the steam turbine.

* * * * *